July 5, 1932.     A. SONNEFELD     1,865,977
OPTICAL SYSTEM
Filed Oct. 24, 1930

$r_1 = + 4.45$
$r_2 = - 20.02$
$r_3 = - 3.80$
$r_4 = + 5.00$
$r_5 = - 19.87$
$r_6 = - 5.55$ $d_I = 2.5$
$l_1 = 1.6$
$d_{II} = 0.3$
$l_2 = 1.2$
$l_3 = 20$
$d_{III} = 2.5$

|  | I und II | III |
|---|---|---|
| $n_d$ | 1.5891 | 1.6477 |
| $v_d$ | 61.2 | 33.9 |

Inventor:
August Sonnefeld

Patented July 5, 1932

1,865,977

UNITED STATES PATENT OFFICE

AUGUST SONNEFELD, OF JENA, GERMANY, ASSIGNOR TO THE FIRM CARL ZEISS, OF JENA, GERMANY

OPTICAL SYSTEM

Application filed October 24, 1930, Serial No. 490,953, and in Germany October 28, 1929.

It is a well known fact that microscope objectives produce images of plane objects, which images do not lie in a plane but on a concave surface the hollow side of which faces the objective. With a view to obtaining by means of microscope objectives images that are plane to the greatest possible extent, especially for the purpose of projecting and photographing, microscope objectives have been provided behind with a special additional system which images again the concave image projected by the said objective. First converging additional systems, similar to the ordinary oculars, were used. This construction, however, did not give any satisfactory results and, moreover, these converging systems had the disadvantage that each of them provided a more or less satisfactory image only together with a definite type of microscope objectives or a few objectives. Better results were arrived at by using dispersively acting additional systems. Such systems, however, cause a strong lateral diffusion of the imaging rays, which is undesirable in many respects.

According to the invention the image is flattened very efficiently by means of converging additional systems when the system which is meant to provide such flattening is made of three lenses separated by air, that is to say of a dispersive lens inserted between two converging lenses, and when these lenses are so constructed that the Petzval sum $$\Sigma\left(-\frac{\varphi}{n}\right)$$

becomes negative for the system, where $\varphi$ and $n$ are the symbols for the refractive powers and the refractive indices, respectively, of the lenses, and where $\Sigma$ is the usual sum symbol. Like the oculars, this system is conveniently used together with a field lens which is disposed near the image projected by the microscope objective and directs the imaging principal rays to the additional system.

The value which the Petzval sum must be given for the additional system flattening the image depends on both, the amount to which the image field is concave and the astigmatic errors of the microscope objectives which are to be used in connection with the respective additional system. It proved that one and the same additional system corresponding to the invention can be used together with a series of different microscope objectives as, for instance, with objectives which magnify 10 to 90 fold and whose apertures lie between 0.3 and 1.3, respectively. In view of this fact it proved advisable to make the numerical value of the Petzval sum equal to at least three quarters of the reciprocal value of the focal length of the additional system. With a focal length of 25 mm., the sum becomes, for instance $$\Sigma\left(-\frac{\varphi}{n}\right)=-0.03.$$

The systems according to the invention offer a special advantage in that the magnification of the image produced by the microscope objective can be altered within wide limits without any substantial alteration in the quality of the image projected on the screen surface. In order to obtain a good correction it is further advisable to make the converging lens of the additional system which faces the objective biconvex according to the invention and to give the other converging lens the form of a meniscus whose hollow surface faces the dispersive lens of the system. The two converging lenses and the dispersive lens are suitably made of highly refractive heavy crown and heavy flint glass, respectively.

The additional systems according to the invention naturally may be usefully employed also in the reverse path of rays so as to provide together with microscope objectives strongly diminished images.

By adding to the additional system a small astronomical telescope consisting of, say, two oculars facing each other by which the exit pupil of the system is displaced into a suitable distance from the last lens, the additional system can be widened into an ocular with flattened image field, that is to say, of being rendered applicable also for subjective examination.

The accompanying drawing represents a constructional example of an additional system according to the invention. For this system, which has a focal length of 25 mm., the different values, expressed in millimeters, amount to

| Radii | Thicknesses and distances |
|---|---|
| $r_1 = + 4.45$ | $d_I = 2.5$ |
| $r_2 = -20.02$ | $l_1 = 1.6$ |
| $r_3 = - 3.80$ | $d_{II} = 0.3$ |
| $r_4 = + 5.00$ | $l_2 = 1.2$ |
| $r_5 = -19.87$ | $l_3 = 2.0$ |
| $r_6 = - 5.55$ | $d_{III} = 2.5$ |

For the kinds of glass used hold good the values

| | $L_I$ and $L_{III}$ | $L_{II}$ |
|---|---|---|
| $n_d$ | 1.5891 | 1.6477 |
| $v_d$ | 61.2 | 33.9 |

The system represented by the drawing can be used, for instance, in photography when it is applied in connection with a microscope objective which, if taken alone, would produce an image lying on a concave surface $t$. However, in front of this image and at a distance of $a=3.0$ mm. from the vertex of the said concave surface $t$ is provided a field lens $u$ which has the following dimensions in millimeters $$r_7 = +16.552 \qquad r_8 = \infty \qquad d_u = 3.0$$

and is made of crown glass having the values $$n_d = 1.5163 \text{ and } v_d = 64.0.$$

When the additional system has from the vertex of the concave surface $t$ a distance of 25.7 mm. the sensitive side of the photographic plate must be given from the additional system a distance $c=140$ mm., in which case the additional system will allow five fold magnification. When the additional system is given from the vertex of the concave surface $t$ a distance of, for example, $b=23.2$ mm., the sensitive side of the photographic plate must be at a distance of $c=265$ mm. and the additional system furnishes ten fold magnification.

I claim:

1. A converging optical system for imaging in a plane the image projected by a microscope objective on a curved surface, consisting of a dispersive lens and two converging lenses, the dispersive lens being placed between the converging lenses and separated from them by air, the said three lenses being so constructed that the Petzval sum $$\Sigma\left(-\frac{\varphi}{n}\right)$$

is negative for the system.

2. In an optical system according to claim 1 the numerical value of the Petzval sum amounting to at least three quarters of the reciprocal value of the focal length of the system.

3. In an optical system according to claim 1 of the two converging lenses the one facing the microscope objective being biconvex and the other having the form of a meniscus of which the hollow surface faces the dispersive lens.

4. In an optical system according to claim 1 the two converging lenses and the dispersive lens being of highly refractive heavy crown and heavy flint glass, respectively.

AUGUST SONNEFELD.